United States Patent

Syed

(10) Patent No.: US 12,079,753 B2
(45) Date of Patent: Sep. 3, 2024

(54) LIFECYCLE FRAGMENT AND DYNAMIC DISCOVERY OF LIFECYCLE FRAGMENT AT RUNTIME

(71) Applicant: Open Text Corporation, Waterloo (CA)

(72) Inventor: Ashraf Ali Syed, Bangalore (IN)

(73) Assignee: OPEN TEXT CORPORATION, Waterloo (CA)

( * ) Notice: Subject to any disclaimer, the term of this patent is extended or adjusted under 35 U.S.C. 154(b) by 224 days.

(21) Appl. No.: 17/507,890

(22) Filed: Oct. 22, 2021

(65) Prior Publication Data

US 2022/0129818 A1    Apr. 28, 2022

Related U.S. Application Data

(60) Provisional application No. 63/104,409, filed on Oct. 22, 2020.

(51) Int. Cl.
 *G06Q 10/0631* (2023.01)
 *G06Q 10/0633* (2023.01)
(52) U.S. Cl.
 CPC ... *G06Q 10/06316* (2013.01); *G06Q 10/0633* (2013.01)
(58) Field of Classification Search
 CPC .......................................... G06Q 10/00–50/00
 USPC ................................................ 705/7.11–7.42
 See application file for complete search history.

(56) References Cited

U.S. PATENT DOCUMENTS

| | | | | |
|---|---|---|---|---|
| 6,028,997 | A * | 2/2000 | Leymann | G06Q 10/0633 715/965 |
| 8,150,541 | B2 * | 4/2012 | Moore, Jr. | G05B 19/41865 700/103 |
| 8,898,442 | B2 * | 11/2014 | Stoitsev | G06F 8/10 718/107 |
| 11,295,260 | B2 * | 4/2022 | Burman | G06Q 10/06316 |
| 2002/0188597 | A1 * | 12/2002 | Kern | G06Q 30/06 |
| 2003/0177046 | A1 * | 9/2003 | Socha-Leialoha | G06Q 10/103 717/101 |
| 2004/0133457 | A1 * | 7/2004 | Sadiq | G06Q 10/0633 705/7.26 |
| 2005/0120352 | A1 * | 6/2005 | Subramaniam | G06F 16/25 719/310 |
| 2006/0074731 | A1 * | 4/2006 | Green | G06Q 10/06316 705/7.27 |
| 2006/0074736 | A1 * | 4/2006 | Shukla | G06Q 10/06 717/100 |
| 2006/0242302 | A1 * | 10/2006 | Walker | G06Q 10/06 709/227 |
| 2007/0061776 | A1 * | 3/2007 | Ryan | G06F 8/10 717/104 |
| 2008/0288464 | A1 * | 11/2008 | Facciorusso | G06Q 10/063 |
| 2011/0029983 | A1 * | 2/2011 | Lu | G06Q 10/0633 718/105 |

(Continued)

*Primary Examiner* — Alan S Miller
(74) *Attorney, Agent, or Firm* — Sprinkle IP Law Group (57) ABSTRACT

Systems and methods for are provided that make lifecycles flexible, so the behavior of the lifecycle can be changed dynamically at runtime based on certain conditions. Embodiments include a system and method that enables the use and reuse of lifecycle fragments in a lifecycle process. Lifecycle fragments can be discovered and executed at runtime based on input data and other conditions to provide flexibility and efficiency.

20 Claims, 6 Drawing Sheets

(56) References Cited

U.S. PATENT DOCUMENTS

| | | | | |
|---|---|---|---|---|
| 2014/0129005 A1* | 5/2014 | Weatherhead | ...... | G06F 21/6227 |
| | | | | 700/86 |
| 2017/0048285 A1* | 2/2017 | Pearl | ...... | G06F 16/11 |
| 2020/0167708 A1* | 5/2020 | Rajasekar | ...... | G06F 9/44526 |
| 2021/0141621 A1* | 5/2021 | Scolnick | ...... | G06F 40/186 |

* cited by examiner

LIFECYCLE FRAGMENT AND DYNAMIC DISCOVERY OF LIFECYCLE FRAGMENT AT RUNTIME

CROSS-REFERENCE TO RELATED APPLICATION(S)

This application claims a benefit of priority under 35 U.S.C. § 119(e) from U.S. Provisional Application No. 63/104,409, filed Oct. 22, 2020, entitled "LIFECYCLE FRAGMENT AND DYNAMIC DISCOVERY OF LIFECYCLE FRAGMENT AT RUNTIME," which is fully incorporated by reference herein for all purposes.

TECHNICAL FIELD

This disclosure relates generally to the field of content management systems. In particular, this disclosure relates to systems and methods that enable the use and reuse of lifecycle fragments in a lifecycle process. Even more specifically, this disclosure relates to systems and methods that enable lifecycles to be flexible and dynamically changeable at runtime.

BACKGROUND

In the field of document management, a lifecycle is a process of reviewing documents and applying organization specific policies and rules on the documents. In a typical content management system, lifecycles are very integral parts of the system. Businesses have been evolving to a paperless environment and using lifecycle processes on the digital contents (i.e., documents) to process information faster.

In typical dynamic business environments, certain business rules change often. Organizations may not be able to afford the time and cost involved to redesign and redeploy lifecycle processes to react to varying situations and requirements. Organizations also cannot change a lifecycle at runtime or change the behavior of a lifecycle at runtime once it is deployed. Traditional systems are not capable of reusing lifecycles, and any changes require a lifecycle to be re-designed.

Therefore, there is a need for ways to make lifecycles flexible, so the behavior of the lifecycle can be changed dynamically at runtime based on certain conditions. Also, in many lifecycles, there are parts of a lifecycle where it would be desirable to reuse the lifecycle as is, in other lifecycles. However, reusing part of a lifecycle in other lifecycles (both at design time and runtime), making a lifecycle flexible, reducing duplication, and maintaining consistency, present various problems and challenges.

SUMMARY

Systems and methods are described that provide the ability to reuse business logic in lifecycle processes. Some embodiments allow a designer to provide a placeholder between process steps in lifecycle process. During runtime of the lifecycle process, a lifecycle fragment is selected based on input or other data. The selected lifecycle fragment is fetched and executed to generate an output using the received data from the previous process step.

In some embodiments, a default lifecycle fragment will be used if no stored lifecycle fragments meet criteria specified by a lifecycle fragment widget. In some embodiments, lifecycle fragments in a lifecycle can be configured to be linked to a stored lifecycle fragment, such that updates to the stored lifecycle fragment will be reflected in the linked lifecycle fragment. In some embodiments, lifecycle fragments in a lifecycle can be configured to be cloned from a stored lifecycle fragment, such that updates to the stored lifecycle fragment will not be reflected in the linked lifecycle fragment.

Embodiments of the present invention also include computer-readable storage media containing sets of instructions to cause one or more processors to perform the methods, variations of the methods, and other operations described herein.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As discussed above, there is a need for ways to make lifecycles flexible, so the behavior of the lifecycle can be changed dynamically at runtime based on certain conditions. In addition, it would be desirable to reuse portions of lifecycles in other lifecycles. To solve these problems and address these challenges, the present disclosure describes something analogous to reusable building blocks, which can be bound together to create complete lifecycles. In some embodiments, the binding can be done at design time or at runtime. This disclosure describes examples of ways to implement this solution.

The present disclosure describes a lifecycle fragment as a reusable smaller building block of a lifecycle process, which allows reuse of business logic. The lifecycle fragment binding with other lifecycle fragments or lifecycle processes can happen at design time as well as at runtime (described below). The design time binding can reduce design cost by reusing lifecycle fragments whereas runtime binding makes lifecycles flexible by dynamic discovery of lifecycle fragments to be composed. The present disclosure describes various related concepts, including a comparison with traditional systems, lifecycle fragments, lifecycle fragment binding, design time binding, and dynamic discovery and binding at runtime.

The concepts described in the present disclosure provide various advantages over traditional systems, including the ability to:

allow reusability which saves design time and cost;
allow the ability to make a change the lifecycle process behavior on the fly;
allow default/fall back mechanisms; and
allow dynamic binding of control flow through name match.

In content management systems, the reusability of lifecycles could be achieved by attaching a lifecycle to the base type (i.e., dm_sysobject). This would allow applying the same lifecycle to all its sub-types. However, this is different from the concept of lifecycle fragments, discussed below, because it only allows the reusability of a complete lifecycle process. Also, the same lifecycle may not be applicable to many content types in the organization. Also, in typical content management systems, the systems do not support a flexible lifecycle process. This means that a lifecycle process is highly predictable at design time, and if a lifecycle needs to be changed, then it needs to be redesigned and redeployed.

Following is a description of an exemplary lifecycle, described in the context of document management. Generally, a lifecycle is a process of steps or stages that a document goes through for a given process. For example, when a company issues a purchase order, the document (e.g., a purchase order) may have to go through a purchase order approval lifecycle.

Figure 1:
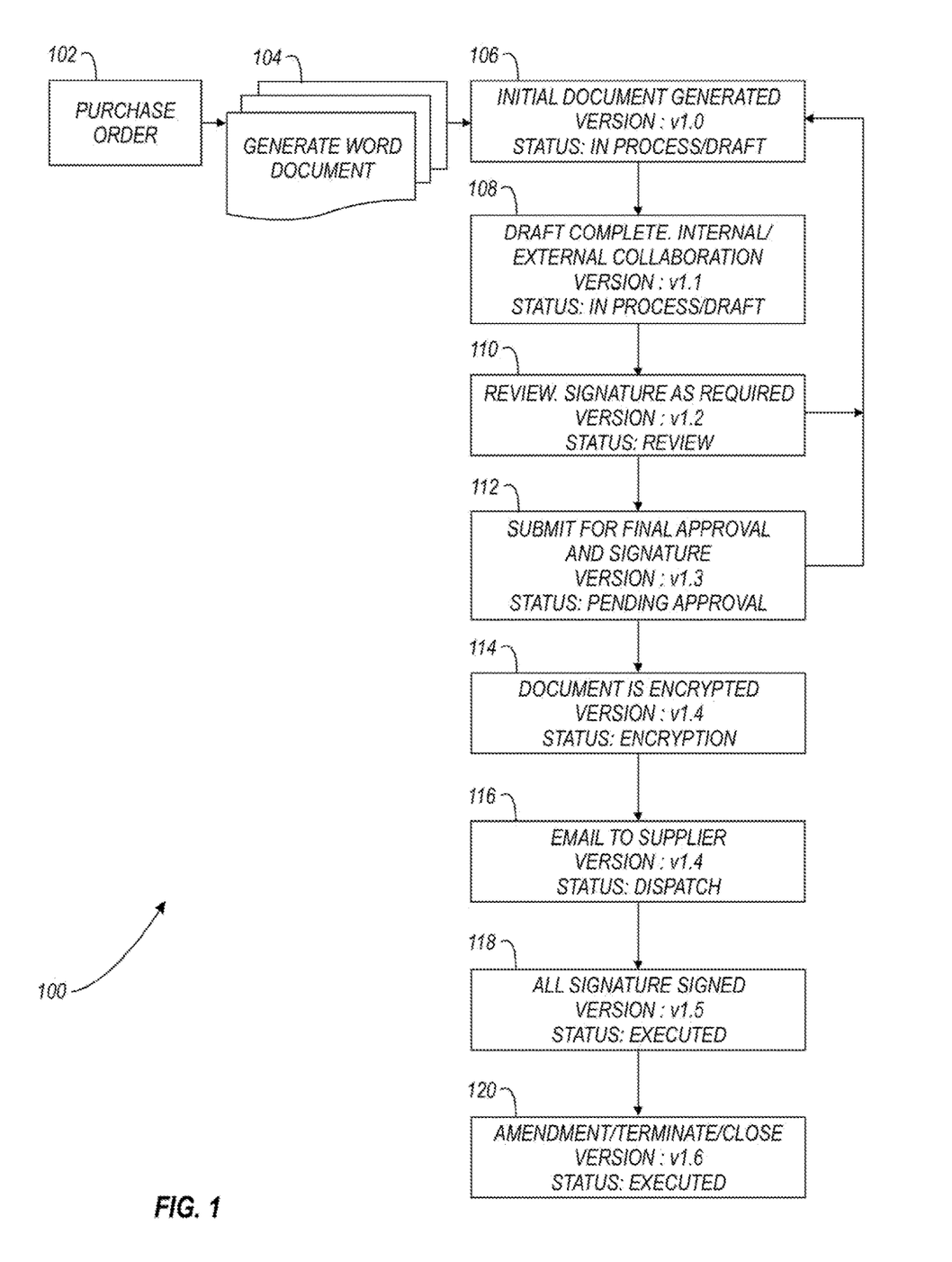
FIG. 1 depicts a diagram representing an example of a lifecycle.

FIG. 1 shows an example of a purchase order approval lifecycle 100. In the example shown, each lifecycle phase is represented by a block, including a descriptive title, a version number, and a status indicator. In this example, a purchase order 102 is converted into a word document 104. The first lifecycle step 106 shown in this example generates, from the generate word document, the document in electronic form, and becomes a draft of a purchase order 106. In the example of FIG. 1, the initial document is shown with version indicator v1.0, and includes a status ("in process/draft"). Once the document is drafted, it is subject to collaboration with internal and external users to become a proper purchase order (block 108). The business process steps required for a purchase order will vary by application, organization, regulations, etc., and other factors and considerations.

In this example, once the purchase order is created, it has to be signed (by all or some of the users). Once the document is signed (block 110), the purchase order will be submitted for final approval and signature (block 112), and the status will change to "pending approval." Once the document is approved, the document is encrypted (block 114), and sent to a supplier (block 116). When the document is received by the supplier, the supplier will sign the purchase order (block 118), indicating that the supplier has agreed to the purchase order. At this point, the status is updated to "executed." When the purchase order is executed, then the last step is to close the purchase order (block 120). Alternatively, if the supplier does not agree to the purchase order, the last step may involve terminating the order, or amending the order.

Each lifecycle, such as the example described above with respect to FIG. 1, has a purpose, or a business use case. In the example of FIG. 1, the lifecycle is attached to a specific document type (a purchase order), and this lifecycle can only be used for that purpose. If the organization has other processes, then each process will have their own lifecycle.

Figure 2:
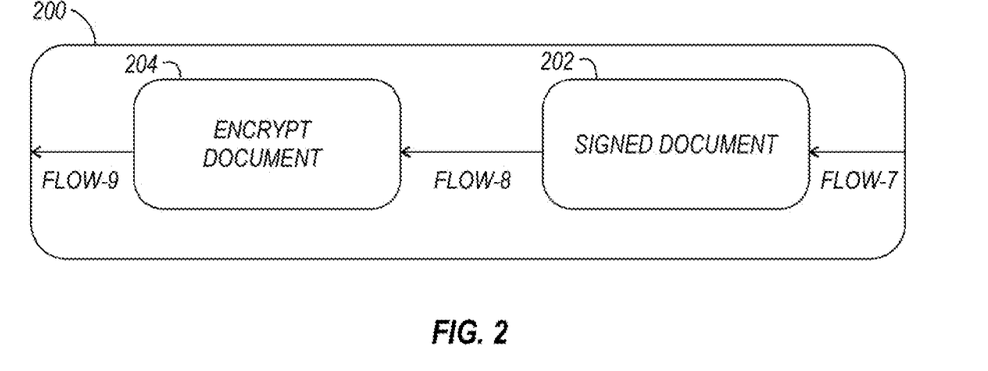
FIG. 2 depicts a diagram of an exemplary lifecycle fragment.

FIG. 2 shows a diagram of an exemplary lifecycle fragment 200. A lifecycle fragment solves several problems. For example, lifecycle fragment 200 of FIG. 2 shows a simple example of two steps that may be common in many lifecycles (relating to document encryption). In this example, a first step 202 relates to a document signing. A second step 204 relates to the encryption of the document. In traditional systems, these steps may have to be repeated by designers every time a lifecycle is created. This results in duplicative efforts. So, if these common steps can be incorporated as a lifecycle fragment, they can be reused in many lifecycles, rather than duplicating these steps at design time.

At run-time, a lifecycle can provide flexibility. For example, if some portion of a business process is changed after design time, rather than redeploying every lifecycle that is affected by the change, the relevant lifecycle fragment(s) can be changed. For example, in the context of the example lifecycle shown in FIG. 1 that incorporates one or more lifecycle fragments, perhaps a new encryption logic is adopted, or perhaps the way documents are sent to suppliers is changed, etc. With a lifecycle fragment, if there is a change like this in the future, a new/updated lifecycle fragment incorporating the change can replace the previous lifecycle fragment, without redeploying the entire lifecycle.

Figure 3:
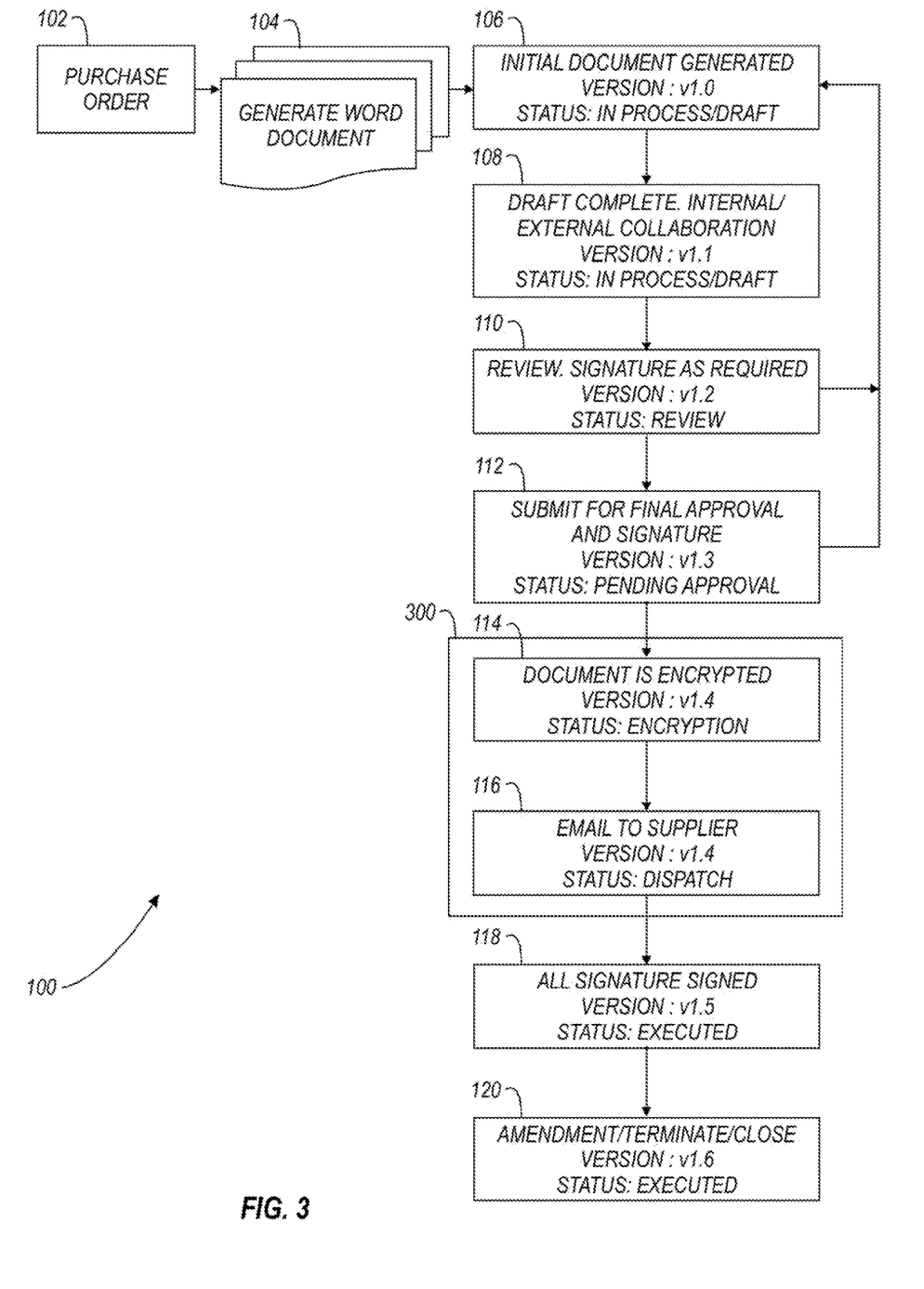
FIGS. 3-4 depict an example of creating a lifecycle fragment by extracting portions from a lifecycle.
Figure 4:
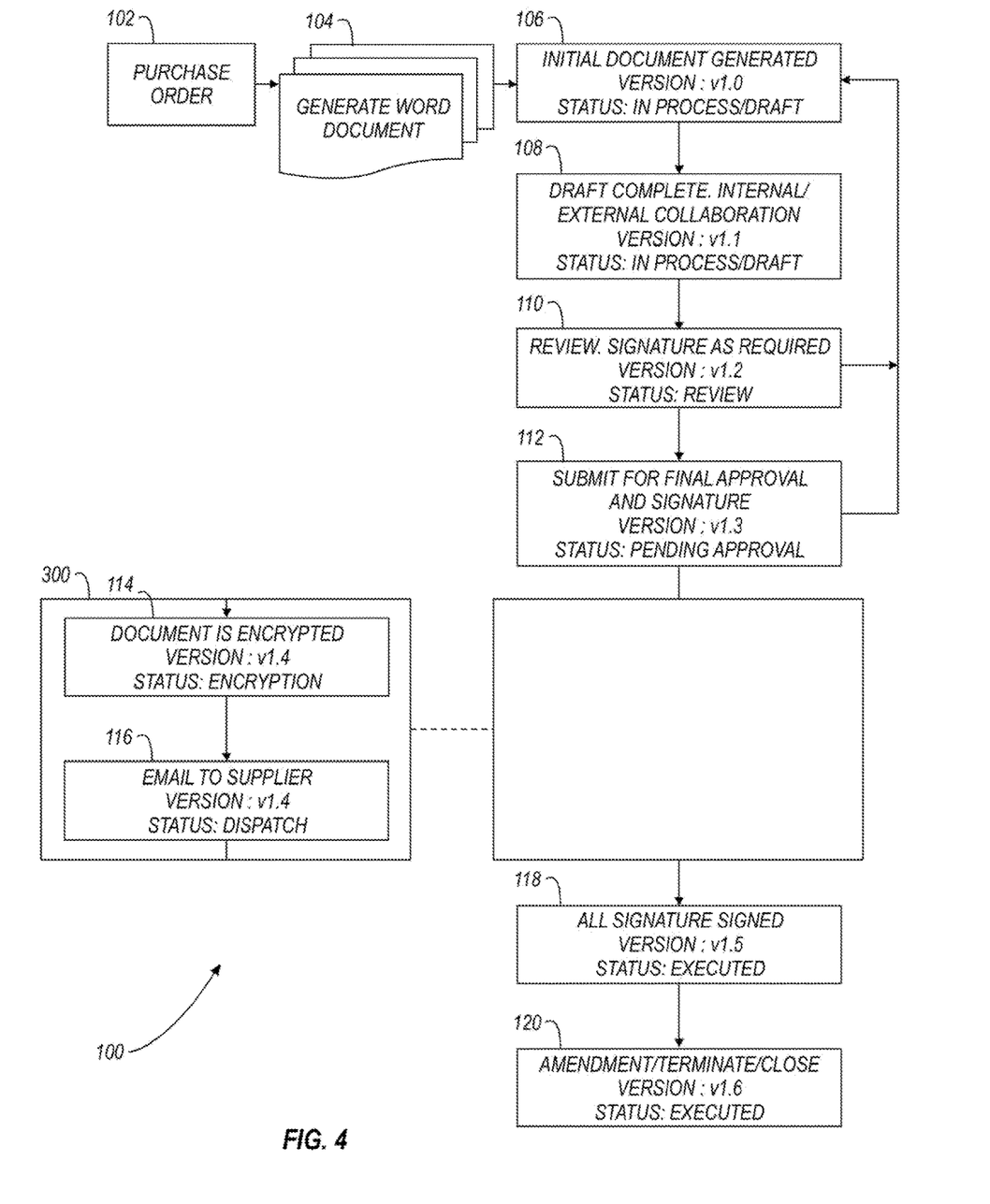

A lifecycle fragment can be created in any desired manner, for example from the top-down, or from the bottom-up. In the top-down approach, a lifecycle fragment is created by extracting out a part of a lifecycle from a complete lifecycle process. For example, if it is determined that a portion of a lifecycle would be useful as a lifecycle fragment, a lifecycle fragment can be created that incorporates the relevant steps. In the bottom-up approach, a lifecycle fragment is created from scratch. For example, FIG. 3 shows the lifecycle 100 of FIG. 1, with a box 300 drawn around the lifecycle steps 114 and 116 ("document is encrypted" and "email to supplier"). Since these two steps may be commonly used in multiple different lifecycles, a lifecycle fragment can be created for these steps, and reused in other lifecycles. FIG. 4 shows the two steps 114 and 116 extracted from the lifecycle process of FIG. 4. These extracted steps 114 and 116 can be the basis for a new lifecycle fragment that can then be used in any other lifecycles.

FIG. 2, discussed above, shows one example of a lifecycle fragment created from scratch, for example. The exemplary lifecycle fragment shown in FIG. 2 has two process steps, including "signed document" 202 and "encrypt document" 204. As an example, this lifecycle fragment may be used by a lifecycle designer that wants to include the encryption of a signed document into some point in a lifecycle. The lifecycle fragment of FIG. 2 includes an entry point (labeled "flow-7") and an exit point (labeled "flow-9") and can be bound to points in a lifecycle, or with other lifecycle fragments (described above with respect to FIG. 5). The lifecycle fragment of FIG. 2 also has an intermediate point (labeled "flow-8") between the "signed document" element 202 and the "encrypt document" element 204.

In some embodiments, a lifecycle fragment has a unique name or Id to which the lifecycle fragment will be referred during runtime and design time. A lifecycle fragment may contain steps (e.g., see FIG. 2) and their properties (e.g., metadata), and control flows (e.g., "flow-7," "flow-8," "flow-9"). Exemplary metadata may include information such as who can perform the relevant step (who can sign a document), etc. In some embodiments, a lifecycle fragment does not bind to any content type and is not attached to any content type directly. In some embodiments, a lifecycle fragment comprises at least one step and contains a single entry point and a single exit point (control flow) to bind with a lifecycle process or with other lifecycle fragments. In the exemplary lifecycle shown in FIG. 5 (described below), the lifecycle fragment that contains the "Decrypt document" (step 514) has an entry point "flow-2" and an exit point "flow-3." So, the data at flow-1 becomes the input to the lifecycle fragment (after the creation of the title page).

In some embodiments, there are two options to use a lifecycle fragment—in a "linked" fashion or a "clone" mode. In a "linked" model, any changes to the original lifecycle fragment will be made applicable to all subscribers (i.e., all lifecycle fragments based on the original) immediately. In other words, when a lifecycle fragment is changed, all of the linked lifecycle fragments that are used in various lifecycles will also be changed. In a "clone" model, if there is any change to the original lifecycle fragment, a new copy of lifecycle fragment will be published thus not affecting running lifecycles. In other words, changes to the original lifecycle will not affect existing lifecycles incorporating that lifecycle in the clone model.

The implementation of a linked mode or clone mode can be accomplished in any desired manner. For example, for a lifecycle fragment using the "linked model," the system can use a table having all of the lifecycle definitions. At runtime, when the lifecycle is being executed, and the lifecycle fragment is using the linked model, there will be only one instance of the lifecycle fragment running. In other words, the lifecycle fragment is stored in the table, and the relevant lifecycle will have a reference to that lifecycle fragment. During execution, the executing instance of the lifecycle will refer to the stored lifecycle fragment, so any change that is made to the lifecycle fragment will be reflected in the overall lifecycle process (in the linked model). For a lifecycle fragment implemented using the clone model, another instance of the lifecycle fragment is created, that is independent of other instances of the same lifecycle fragment. In other words, using the linked model, every lifecycle process that shares a linked lifecycle fragment, data is passed to the same executing instance of the lifecycle fragment. Using the cloned model, a new instance of the lifecycle fragment is created in the database with its own identifier, and any lifecycle process that incorporates that cloned lifecycle fragment with have its own separate executing instance of the lifecycle fragment at runtime that is referred to by its own lifecycle fragment identifier.

When you have a lifecycle and one or more lifecycle fragments, you need a way to bind the lifecycle fragment(s) to the lifecycle process. Referring again to the exemplary purchase order lifecycle described above, certain conditions may affect the lifecycle. For example, assume that a purchase order less than a threshold amount is handled by a given organization differently that a purchase order above the threshold (e.g., a certain type of approval is required for purchase orders above $1,000,000). In other examples, conditions can relate to any desired criteria, such as subject matter, geography, dates, etc. So, depending on the conditions, you will want a different lifecycle fragment bound to the lifecycle process.

Figure 5:
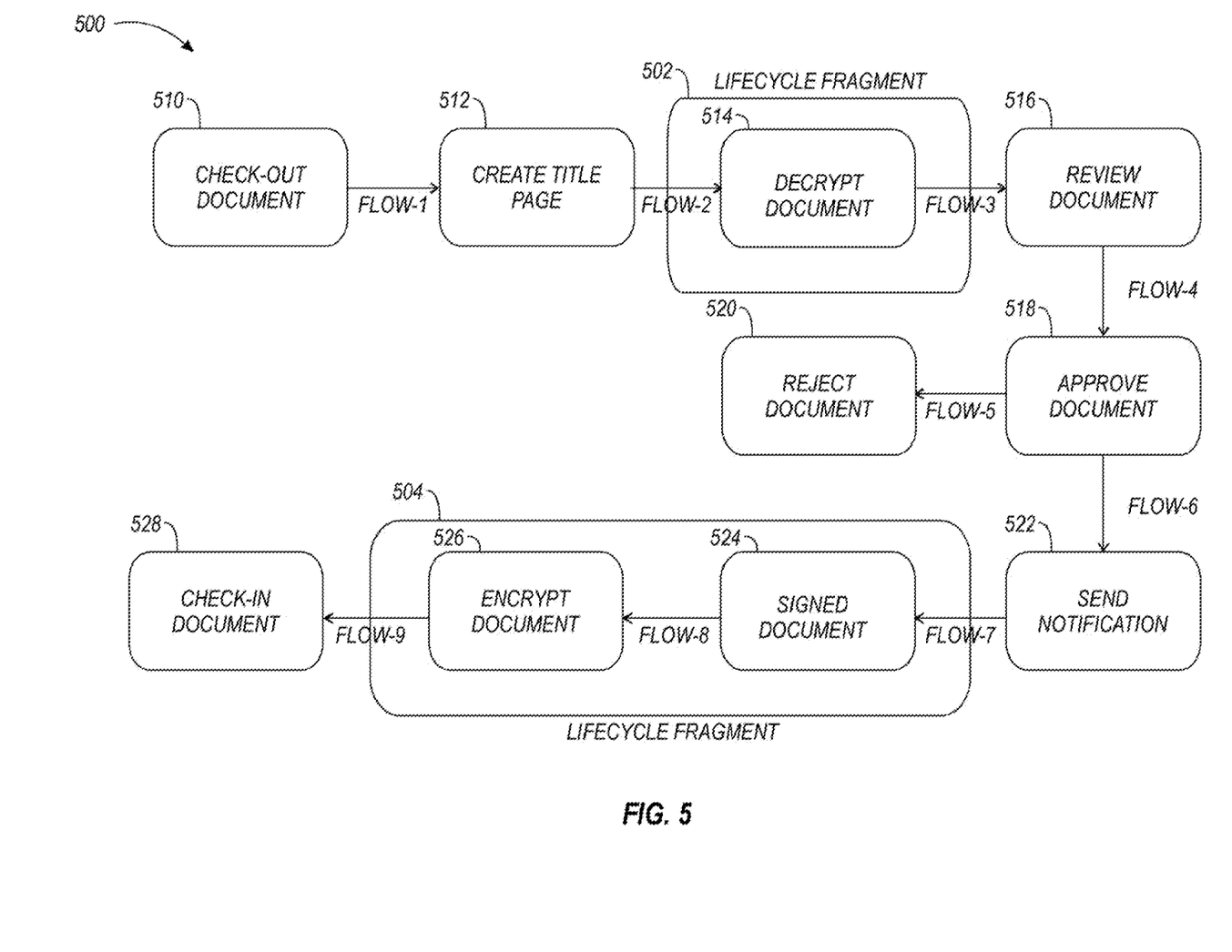
FIG. 5 depicts a diagram of an lifecycle incorporating multiple lifecycle fragments.

In some embodiments, a lifecycle fragment is bound to other lifecycle fragments and/or a lifecycle process using lifecycle fragment widgets. FIG. 5 is a block diagram of one example showing the concept of a lifecycle fragment widget. A fragment widget is a placeholder which indicates that a certain part of the lifecycle process will contain a lifecycle fragment. A fragment widget has an integration point (e.g., at flow-2/flow-3, flow-7/flow-9, etc., in FIG. 5) which allows a lifecycle fragment to bind to other fragments or lifecycle processes. A fragment widget will contain logic or conditions that specify which lifecycle fragment to select and execute. So, at runtime, a decision can be made as to which lifecycle fragment is to be executed, based on logic in the fragment widget. In other words, fragment widgets effectively are making runtime decisions as to which lifecycle fragment is executed, based on defined conditions.

A fragment widget is responsible for resolving applicable fragments based on the binding (discussed above). A fragment widget also defines a default (fall back) fragment and a fragment type. The default fragment can be used as a fall back when a fragment to be discovered using expressions is not found. In other words, if none of the conditions of a fragment widget are met, the default fragment can be used. A fragment widget also executes a lifecycle fragment in a context of the lifecycle process to which it is bound. The entry and exit control flow are mapped through names (e.g., flow-1, flow-2, . . . , etc. in FIG. 5) if the default fragment is not defined.

The example of FIG. 5 shows a lifecycle 500, including lifecycle widgets 502 and 504. The various steps of the lifecycle include entry points and exit points (FLOW-1, FLOW-2, . . . FLOW-9), as labeled in FIG. 5. The lifecycle begins with step 510 where a document is checked out. Next, a title page is created at step 512. The exit point (FLOW-2) of step 512 is also the entry point of widget 502. In this example, the lifecycle fragment used with widget 502 comprises a document decryption step 514. The widget 502 has an exit point (FLOW-3) that is provided as an entry point to the preview document step 516. Next, at step 518, the document is approved (or not). If the document is rejected, the lifecycle ends at step 520. If approved, the lifecycle proceeds to step 522, where a notification is sent. The exit point (FLOW-7) of step 522 is also the entry point of widget 504. In this example, the lifecycle fragment used with widget 504 comprises a signed document step 524 and a document encryption step 526. The widget 504 has an exit point (FLOW-9) that is provided as an entry point to the document check-in step 528.

In some embodiments, dynamic discovery is desired where everything is not known at design time, where a person does not have a complete view of a lifecycle process, and where things change often. In some embodiments, dynamic discovery is achieved using expressions. This approach allows:

expression based fragment id computation and discovery, and additional capability to specify default fragments in case of expression based fragment discovery—this option provide an ability to establish the contract for common inputs/outputs that would be available from discovered fragments at runtime.

These expressions can be a simple assignment (e.g., to pass scalar data from a source), or can be complex expressions (e.g., gathering data from multiple sources and/or performing an operation on the data). The expressions can use any of the context that are available in the lifecycle to determine which fragment widgets the system is going to invoke.

Figure 6:
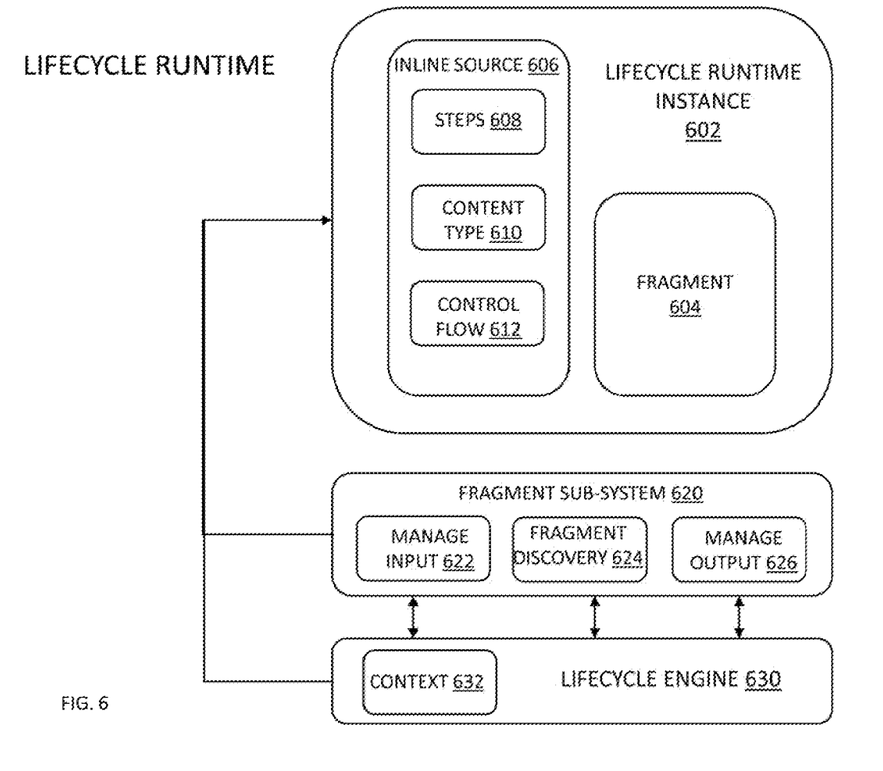
FIG. 6 depicts a runtime view of a lifecycle process.

FIG. 6 is a runtime view of a lifecycle process with a lifecycle fragment and the steps of the lifecycle. FIG. 6 shows a lifecycle runtime instance 602, including a fragment 604 and inline source 606. The inline source 606 includes blocks for steps 608, content type 610, and control flow 612. In the example shown in FIG. 6, inline source 606 refers to the lifecycle itself, without the fragments. Control flow 612 refers to the connections between steps in the lifecycle. Content type 610 refers to the metadata or content type discussed above. FIG. 6 also shows a fragment sub-system (fragment widget) 620 that will ensure that some fragment will be picked up and executed by the lifecycle. The fragment sub-system 620 includes blocks for manage input 622, fragment discovery 624, and manage output 626. The fragment sub-system 620 will read the inputs being passed to a fragment (manage input block 622). Based on the inputs, the fragment sub-system 620 will determine which is the right fragment for this lifecycle (fragment discovery block 624), fetch the fragment from a repository, execute the fragment, generate an output from the fragment, and pass the output to the next step in the lifecycle (manage output 626). In the example of the lifecycle fragment 502 shown in FIG. 5, the input to the lifecycle fragment is the output of the "send notification" step. The input to the lifecycle fragment may include, for example, who should sign the document, what encryption algorithm should be used, etc. Based on the inputs, the desired fragment will be fetched (fragment discovery block) and executed to generate the desired output.

Once the right lifecycle fragment is found by the fragment widget, at runtime, it will be executed in the context of the lifecycle itself. The output of the fragment will get passed onto the lifecycle engine 630 to be passed on to the next step after the fragment. The context block 632 refers to the context of the lifecycle.

One other benefit to the system described relates to efficiency and performance of computer systems implementing these concepts. For example, without the concepts of lifecycle fragments and fragment widgets, etc., lifecycle processes need to be much more complicated to handle various scenarios that can now be handled using lifecycle fragments and fragment widgets. In addition, using the concepts of lifecycle fragments and fragment widgets described above, allows resources to be shared among multiple lifecycle processes, for example, enabling fewer running instances of these process steps running in the system, etc.

In some embodiments, lifecycle fragments can be protected, which prevents some sensitive lifecycle fragments from being shared or made public. Protection can be achieved in any desired manner. For example, any suitable access control mechanism can be used to protect a lifecycle fragment. If desired, at runtime, lifecycle fragment execution context data can be used for auditing, reporting and security purpose.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A method comprising:
providing access to a plurality of stored lifecycle fragments, each of the lifecycle fragments comprising one or more process steps relating to a lifecycle process;
configuring a plurality of sequential process steps arranged to form a lifecycle process;
providing a lifecycle fragment widget between first and second process steps of the lifecycle process, the lifecycle fragment widget having an input and an output, the lifecycle fragment widget containing logic that specifies a selection of a lifecycle fragment for execution based on input data;
during runtime of the lifecycle process, receiving data from the first process step;
selecting, by the logic of the lifecycle fragment, a lifecycle fragment from the plurality of stored lifecycle fragments based on the received data from the first process step;
fetching the selected lifecycle fragment;
executing the selected lifecycle fragment to generate fragment output data using the received data from the first process step; and
providing the fragment output data as an input to the second process step.

2. The method of claim 1, wherein selecting a lifecycle fragment further comprises comparing conditions relating to received data with criteria defined by the lifecycle fragment widget.

3. The method of claim 2, further comprising selecting a default lifecycle fragment if none of the stored lifecycle fragments meet the criteria defined by the lifecycle fragment widget.

4. The method of claim 1, further comprising:
providing a second lifecycle fragment widget between third and fourth process steps of the lifecycle process, the second lifecycle fragment widget having an input and an output, the second lifecycle fragment widget containing second logic that specifies a second selection of a lifecycle fragment for execution based on respective input data;
during runtime of the lifecycle process, receiving data from the third process step;
selecting, by the second logic of the second lifecycle fragment, a second lifecycle fragment from the plurality of stored lifecycle fragments based on the received data from the third process step;
fetching the selected second lifecycle fragment;
executing the second selected lifecycle fragment to generate second fragment output data using the received data from the third process step; and
providing the second fragment output data as an input to the fourth process step.

5. The method of claim 1, further comprising:
updating the selected lifecycle fragment responsive to an update to the respective stored lifecycle fragment.

6. The method of claim 1, wherein one or more of the plurality of stored lifecycle fragments are provided with access control, and wherein the selected lifecycle fragment is fetched after confirming access is allowed.

7. The method of claim 1, wherein the plurality of stored lifecycle fragments includes lifecycle fragments extracted from other lifecycle processes.

8. A system for providing a lifecycle process, the system comprising:
a processor; and
a non-transitory computer readable medium storing instructions translatable by the processor, the instructions when translated by the processor perform:
providing access to a plurality of stored lifecycle fragments, each of the lifecycle fragments comprising one or more process steps relating to a lifecycle process;
configuring a plurality of sequential process steps arranged to form a lifecycle process;
providing a lifecycle fragment widget between first and second process steps of the lifecycle process, the lifecycle fragment widget having an input and an output, the lifecycle fragment widget containing logic that specifies a selection of a lifecycle fragment for execution based on input data;
during runtime of the lifecycle process, receiving data from the first process step;
selecting, by the logic of the lifecycle fragment, a lifecycle fragment from the plurality of stored lifecycle fragments based on the received data from the first process step;
fetching the selected lifecycle fragment;
executing the selected lifecycle fragment to generate fragment output data using the received data from the first process step; and
providing the fragment output data as an input to the second process step.

9. The system of claim 8, wherein selecting a lifecycle fragment further comprises comparing conditions relating to received data with criteria defined by the lifecycle fragment widget.

10. The system of claim 9, further comprising selecting a default lifecycle fragment if none of the stored lifecycle fragments meet the criteria defined by the lifecycle fragment widget.

11. The system of claim 8, further comprising:
providing a second lifecycle fragment widget between third and fourth process steps of the lifecycle process, the second lifecycle fragment widget having an input and an output, the second lifecycle fragment widget containing second logic that specifies a second selection of a lifecycle fragment for execution based on respective input data;
during runtime of the lifecycle process, receiving data from the third process step;
selecting, by the second logic of the second lifecycle fragment, a second lifecycle fragment from the plurality of stored lifecycle fragments based on the received data from the third process step;
fetching the selected second lifecycle fragment;
executing the second selected lifecycle fragment to generate second fragment output data using the received data from the third process step; and
providing the second fragment output data as an input to the fourth process step.

12. The system of claim 8, further comprising:
updating the selected lifecycle fragment responsive to an update to the respective stored lifecycle fragment.

13. The system of claim 8, wherein one or more of the plurality of stored lifecycle fragments are provided with access control, and wherein the selected lifecycle fragment is fetched after confirming access is allowed.

14. The system of claim 8, wherein the plurality of stored lifecycle fragments includes lifecycle fragments extracted from other lifecycle processes.

15. A computer program product comprising a non-transitory computer readable medium storing instructions translatable by a processor, the instructions when translated by the processor perform, in an enterprise computing network environment:
- providing access to a plurality of stored lifecycle fragments, each of the lifecycle fragments comprising one or more process steps relating to a lifecycle process;
- configuring a plurality of sequential process steps arranged to form a lifecycle process;
- providing a lifecycle fragment widget between first and second process steps of the lifecycle process, the lifecycle fragment widget having an input and an output, the lifecycle fragment widget containing logic that specifies a selection of a lifecycle fragment for execution based on input data;
- during runtime of the lifecycle process, receiving data from the first process step;
- selecting, by the logic of the lifecycle fragment, a lifecycle fragment from the plurality of stored lifecycle fragments based on the received data from the first process step;
- fetching the selected lifecycle fragment;
- executing the selected lifecycle fragment to generate fragment output data using the received data from the first process step; and
- providing the fragment output data as an input to the second process step.

16. The computer program product of claim 15, wherein selecting a lifecycle fragment further comprises comparing conditions relating to received data with criteria defined by the lifecycle fragment widget.

17. The computer program product of claim 16, further comprising selecting a default lifecycle fragment if none of the stored lifecycle fragments meet the criteria defined by the lifecycle fragment widget.

18. The computer program product of claim 15, further comprising:
- providing a second lifecycle fragment widget between third and fourth process steps of the lifecycle process, the second lifecycle fragment widget having an input and an output, the second lifecycle fragment widget containing second logic that specifies a second selection of a lifecycle fragment for execution based on respective input data;
- during runtime of the lifecycle process, receiving data from the third process step;
- selecting, by the second logic of the second lifecycle fragment, a second lifecycle fragment from the plurality of stored lifecycle fragments based on the received data from the third process step;
- fetching the selected second lifecycle fragment;
- executing the second selected lifecycle fragment to generate second fragment output data using the received data from the third process step; and
- providing the second fragment output data as an input to the fourth process step.

19. The computer program product of claim 15, wherein one or more of the plurality of stored lifecycle fragments are provided with access control, and wherein the selected lifecycle fragment is fetched after confirming access is allowed.

20. The computer program product of claim 15, wherein the plurality of stored lifecycle fragments includes lifecycle fragments extracted from other lifecycle processes.

* * * * *